US007143798B2

(12) United States Patent
Ratliff, Jr.

(10) Patent No.: US 7,143,798 B2
(45) Date of Patent: *Dec. 5, 2006

(54) PNEUMATIC TIRE HAVING TREAD WITH AXIALLY ADJACENT BLOCK CHAMFER AND RIB CHAMFER

(75) Inventor: Billy Joe Ratliff, Jr., Clinton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 82 days.

This patent is subject to a terminal disclaimer.

(21) Appl. No.: 10/601,986

(22) Filed: Jun. 23, 2003

(65) Prior Publication Data

US 2004/0256041 A1 Dec. 23, 2004

(51) Int. Cl.
*B60C 11/03* (2006.01)
*B60C 11/12* (2006.01)
*B60C 11/13* (2006.01)

(52) U.S. Cl. .................. 152/209.15; 152/209.18; 152/209.21; 152/209.28; 152/DIG. 3

(58) Field of Classification Search .......... 152/209.15, 152/209.18, 209.21, 209.28, DIG. 3
See application file for complete search history.

(56) References Cited

U.S. PATENT DOCUMENTS

| | | | | |
|---|---|---|---|---|
| 4,057,089 A | 11/1977 | Johannsen | ............... | 152/209 R |
| 4,641,695 A | 2/1987 | Lindner | ................... | 152/209 A |
| 4,667,717 A | 5/1987 | Graas | ..................... | 152/209 A |
| 4,726,407 A | 2/1988 | Hayakawn et al. | ..... | 152/209 R |
| 5,152,854 A | 10/1992 | Matsumoto | ................ | 152/209 |
| 5,234,042 A * | 8/1993 | Kuhr et al. | ........... | 152/209.28 |
| D358,793 S | 5/1995 | Himuro et al. | ............ | D12/151 |
| 5,421,391 A | 6/1995 | Himuro | ...................... | 152/209 |
| D366,020 S | 1/1996 | Himuro et al. | ............ | D12/149 |
| 5,609,699 A | 3/1997 | Himuro | ................... | 152/209 R |
| 5,707,461 A | 1/1998 | Himuro | ..................... | 152/209 |
| 5,885,384 A | 3/1999 | Himuro | ................... | 152/209 R |
| 5,967,210 A | 10/1999 | Himuro | ................... | 152/209 A |
| D416,836 S | 11/1999 | Himuro | ..................... | D12/147 |
| 6,123,129 A | 9/2000 | Himuro | ..................... | 152/209 |
| D432,057 S | 10/2000 | Himuro | ..................... | D12/146 |
| 6,213,180 B1 | 4/2001 | Himuro | ................... | 152/209.15 |
| 6,250,354 B1 * | 6/2001 | Kawai | ................... | 152/DIG. 3 |
| D445,730 S | 7/2001 | Himuro | ..................... | D12/147 |
| D454,833 S | 3/2002 | Buresh et al. | ............. | D12/567 |
| 6,520,230 B1 | 2/2003 | Ratliff, Jr. | ................... | 152/209 |
| 2001/0017177 A1 | 8/2001 | Himuro | ................... | 152/209.1 |
| 2002/0062892 A1 | 5/2002 | Himuro | ................ | 152/209.18 |
| 2004/0069389 A1 * | 4/2004 | Ratliff, Jr. | .............. | 152/209.15 |
| 2004/0238092 A1 * | 12/2004 | Colombo et al. | ...... | 152/209.15 |
| 2004/0256039 A1 * | 12/2004 | Ratliff et al. | .......... | 152/209.18 |
| 2004/0256040 A1 * | 12/2004 | Ratliff, Jr. | .............. | 152/209.18 |

FOREIGN PATENT DOCUMENTS

EP 688685 * 12/1995

(Continued)

*Primary Examiner*—Steven D. Maki
(74) *Attorney, Agent, or Firm*—Nancy T. Krawczyk

(57) ABSTRACT

A tire tread for a pneumatic tire has a center rib and a series of steeply slanted grooves in each side region of the tread, the circumferentially adjacent grooves form blocks extending through the tread side regions. The center rib has a serrated configuration along each lateral side and a supporting chamfer extending from each serration point. Adjacent to each rib chamfer is a chamfer extending from the axially innermost point of the rib at the junction of two adjacent steeply slanted grooves. The rib is provided with high density siping. The tread blocks are siped wherein the siping density decreases from the tread center to the tread shoulders.

16 Claims, 4 Drawing Sheets

FOREIGN PATENT DOCUMENTS

| | | | |
|---|---|---|---|
| EP | 1 075 971 A1 | | 2/2001 |
| EP | 1197355 | | 4/2002 |
| JP | 1-215604 | * | 8/1989 |
| JP | 02-179508 | * | 7/1990 |
| JP | 2002-29222 | * | 1/2002 |
| JP | 2002-103919 | * | 4/2002 |
| JP | 2002-240513 | * | 8/2002 |

* cited by examiner

PNEUMATIC TIRE HAVING TREAD WITH AXIALLY ADJACENT BLOCK CHAMFER AND RIB CHAMFER

FIELD OF THE INVENTION

The present invention is directed to a tire tread with improved performance in snow and ice and in regular running conditions. The tread is provided with a central rib and a series of steeply slanted grooves adjacent the rib. The rib and the adjacent tread blocks are configured to provide for improved all weather performance.

BACKGROUND OF THE INVENTION

In a conventional tire for typical use as on a passenger car or light truck, the tire tread is provided with a series of grooves, either circumferentially or laterally extending, or a combination of both, to form a plurality of blocks.

The goals of a tire during winter driving condition are to maintain good contact with the road, while providing for enhanced traction. However, since enhanced traction is best achieved by providing most biting edges to the tread pattern, while road contact is achieved by providing more surface area for tread contact, these goal are often conflicting.

SUMMARY OF THE INVENTION

The present invention is directed to a tire with a tread designed for achieving the goals of enhanced traction with excellent wet performance.

Disclosed is a pneumatic tire comprising a tread and shoulders adjacent the tread, the tread comprising a central region and a pair of opposing side regions. The tread has a circumferentially extending rib in the central region, and a plurality of steeply slanted grooves inclined at an angle relative to the circumferential direction of the tire in each side region. The steeply slanted grooves in each side region initiate at the junction of the central region and the side regions and terminate in the shoulders, wherein the adjacent steeply slanted grooves meet to form circumferentially adjacent tread blocks, the blocks extending from the central region to the shoulders. At the axially innermost point of each block is a circumferentially extending chamfer. The block chamfers extend into the junction of the steeply slanted grooves. The lateral edges of the rib have a have laterally oriented edges and circumferentially oriented edges, the laterally oriented edges on each side of the rib being circumferentially offset from the laterally oriented edges on the opposing side of the ribs. Extending from each laterally oriented edge, toward the circumferentially adjacent laterally oriented edge is a chamfer, the chamfer circumferentially extending along the side of the rib. The block chamfers in each side region and the rib chamfers located on the adjacent lateral edge of the rib are axially adjacent. The adjacent chamfers effectively create a wide circumferentially extending groove for water flow, while the chamfers also support the rib and blocks, creating more biting edges as the tread wears.

In one aspect of the invention, the tread blocks extend continuously from the central region to the shoulders.

In another aspect of the invention, each rib chamfer extends from the laterally oriented rib edge and decreases in width from the laterally oriented edge to the circumferentially adjacent laterally oriented edge.

The rib chamfers and the block chamfers may have a variety of configurations. In one embodiment, the radial height of the chamfers decrease from the laterally oriented edge to the adjacent serration point. In another embodiment, the axially outermost edges of the chamfer, relative to the central region of the tire, gradually increase in height while the axially innermost edge of the chamfer gradually decreases in height.

In another aspect of the tire, the steeply slanted grooves have a non-constant width as the grooves extend from the central region to the shoulders, the grooves having a maximum width in the central 15% of each side region of the tread. Preferably, the grooves have a maximum width of at least 1.5 times the minimum groove width of the steeply slanted grooves.

In another aspect of the invention, the tread rib has a plurality of sipes, with the sipes having a density of 2 to 8 sipes per inch (0.78–3.15 per cm). For reducing tread stiffness as the tread wears, the rib sipes may extend laterally into the chamfers.

In another aspect of the invention, the net-to-gross ratio of the tire decreases from the tread edge toward the tread center, with a maximum net-to-gross ratio at the equatorial plane of the tire. Due to the overlapping chamfers, the net-to-gross ratio on each side of the rib, measured from the axially innermost edge of the rib chamfer to the axially outermost edge of the block chamfer, is preferably in the range of 22 to 35%.

BRIEF DESCRIPTION OF THE DRAWINGS

The invention will be described by way of example and with reference to the accompanying drawings in which.

DETAILED DESCRIPTION OF THE INVENTION

The following language is of the best presently contemplated mode or modes of carrying out the invention. This description is made for the purpose of illustrating the general principals of the invention and should not be taken in a limiting sense. The scope of the invention is best determined by reference to the appended claims.

Figure 1:
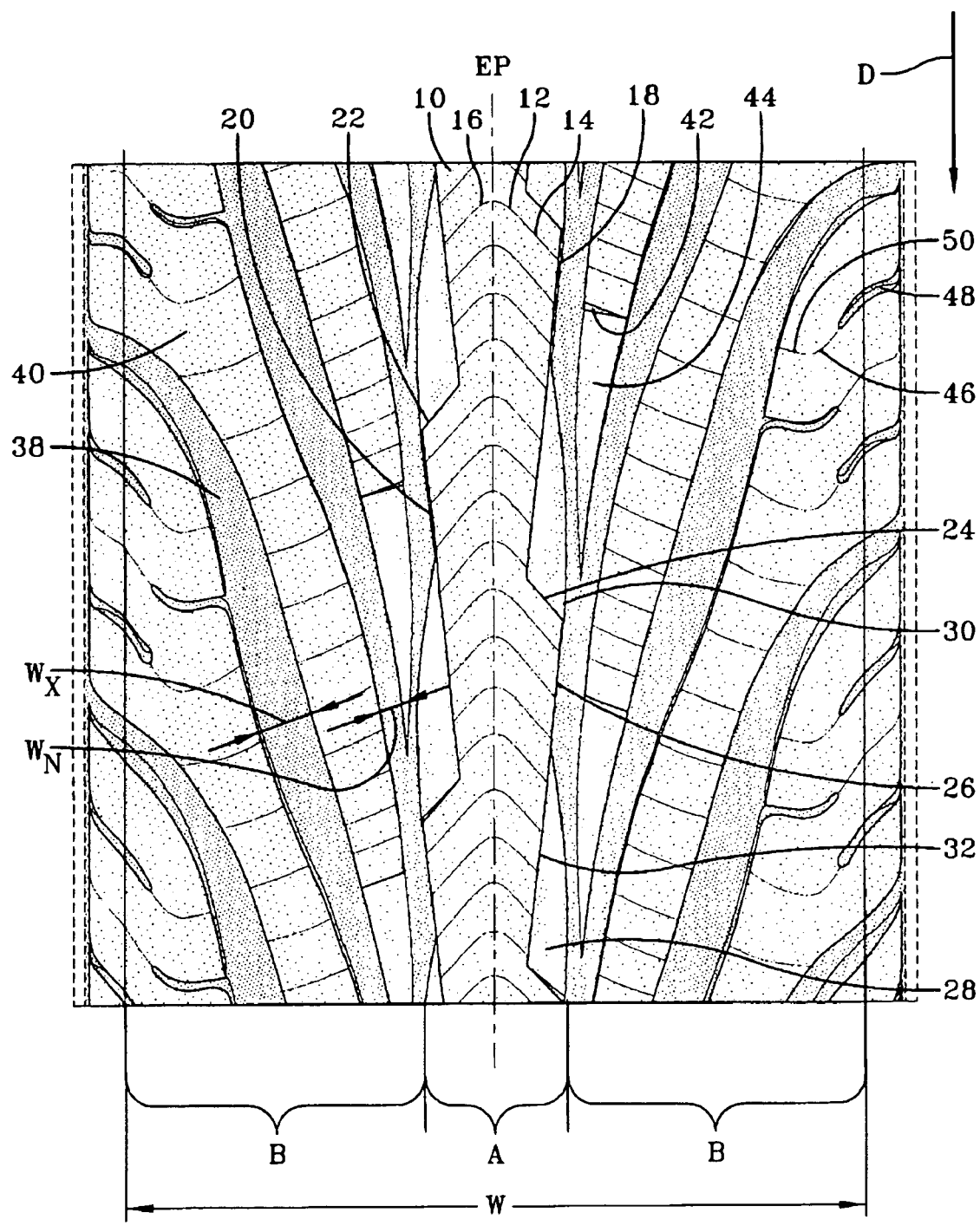
FIG. 1 is a plan view of the tire.

FIG. 1 is a plan view of a tread for a tire in accordance with the present invention. The tread configuration is intended for use on a passenger vehicle, or a light truck. The illustrated tread has a directional configuration, with the preferred direction for forward moving being that shown by the arrow D. The tread is divided into three regions, a central region A, and two side regions B. The central region is centered on the equatorial plane of the tire and has a width of approximately 15% to 30% of the tread width W, the tread width being measured from one tread shoulder to the opposing tread shoulder.

When operating in winter driving conditions, the central region of the tire has the most impact on the performance of the tire. In the present tire tread, the center of the tread is provided with a continuously extending rib 10. The rib 10 has sipes 12 extending across the full lateral width of the rib 10. The rib 10 has a heavy sipe density, within the range of 2 to 8 sipes per inch (0.78 to 3.15 sipes/cm), with a preferred density of 3 to 7 sipes per inch (1.18 to 2.76 sipes/cm). The presence of the rib 10 provides good ground contact of the tire, while the heavy siping of the rib 10, and thus the central region of the tire tread, provides for increased traction as the multiple sipes 12 flex open providing tread edges when the tread contacts the ground.

The rib sipes 12 have a non-linear configuration of at least two inclined portions. The sipes 12 in FIG. 1 are formed of two inclined portions 14, 16. The inclined portions 14, 16 are placed at substantially similar, but oppositely inclined angles to form an inverse V configuration, wherein the apex of the V is located at approximately the equatorial plane EP of the tire. The spacing between circumferentially adjacent sipes 12 is constant, but may be varied to permit pitching of the tire for optimization of the noise characteristics of the tire.

Figure 1B:
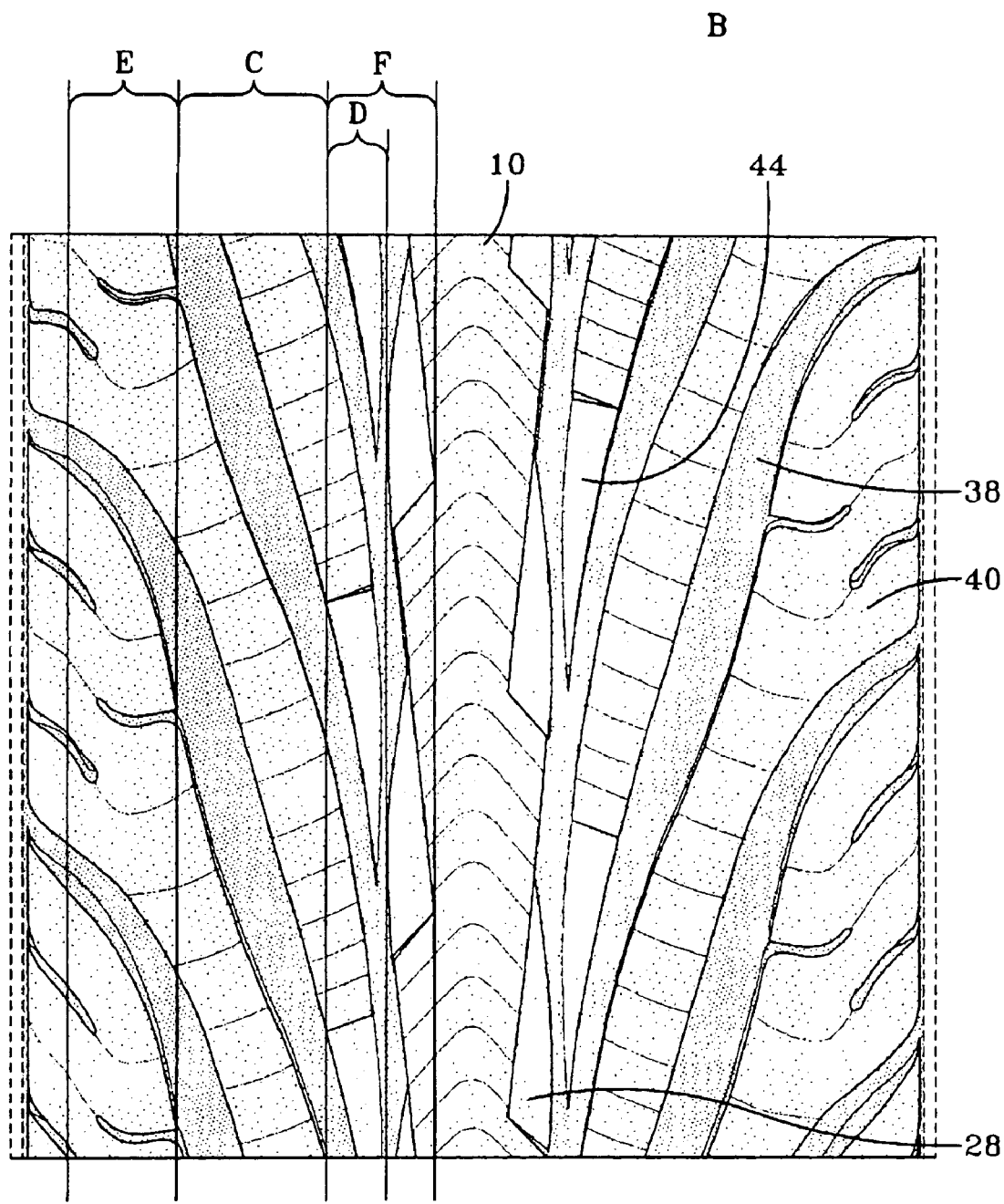
Figure 7:
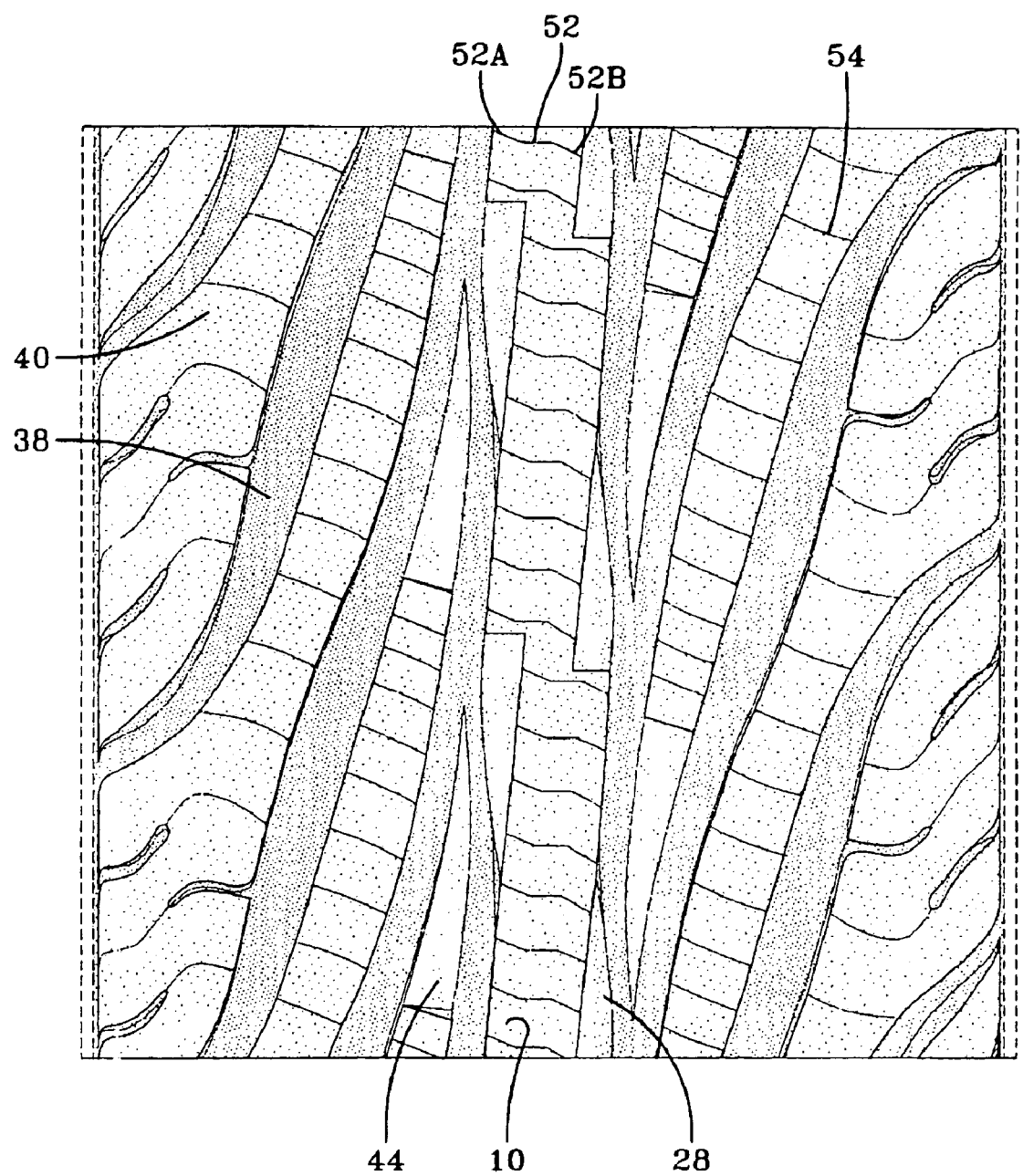
FIG. 7 is another alternative of the tread.

The sides 18, 20 of the rib 10, when viewed from above, has an extended, serrated configuration at the surface of the rib 10 that contacts the ground when the tread is new and not-worn. Each serration 22 is formed from a laterally oriented edge 24 and an inclined circumferentially extending edge 26 extending substantially straight between the laterally oriented edges, as seen in FIGS. 1, 1B, and 7; the junction of the two edges forming a serration point. The serrations 22 on each side 18, 20 of the rib 10 are laterally offset from each other The laterally oriented edge 24 has a high inclination angle relative to the equatorial plane EP, while the circumferentially extending edge 26 has a low inclination angle relative to the equatorial plane EP.

Extending from the laterally oriented edge 24 along each side 18, 20 of the rib 10 is a chamfer 28. The chamfer 28 extends in a circumferential direction from the laterally oriented edge 24 of the serration 22 to the next circumferentially adjacent serration 22, along the side 18, 20 of the rib 10.

Due to the chamfer 28, at the tread depth the rib 10 has an almost straight configuration. The chamfers 28 have a greatest width where the chamfer 28 initiates at the laterally oriented edge 24 of the serration 22. The width of the chamfer 28 narrows as the axially outermost edge 30 of the chamfer 28 is substantially parallel to the equatorial plane LIP of the tire while the sides 18, 20 of the rib 10 are inclined in the circumferential direction. The provision of the chamfers 28 behind the heavily siped rib 10 provides support forte rib 10 as the sipes 12 flex open, strengthening the rib 10 and maintaining good ground contact pressure forte rib 10. As shown in FIGS. 1, 1B, 6 and 7, the axially outer edge of each rib chamfer, relative to the centerline of the rib, is convexly curved.

Figure 2:
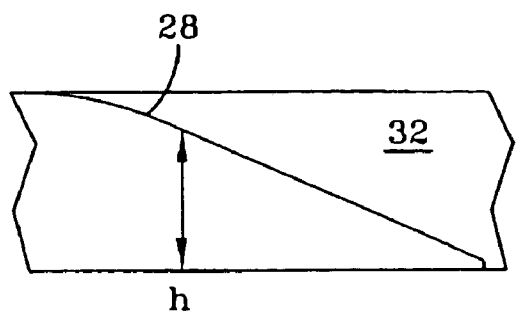
FIGS. 2–5 are various embodiments of the rib chamfers.

FIG 2 illustrates a side view of the chamfer 28. The chamfer 28 has a maximum width at the laterally oriented edge 24 of the serration 22, and gradually decreases in width as the chamfer 28 approaches the next adjacent serration point 22. Concurrently, the height h of the chamfer 28, as measured from the base of the tread depth, gradually decreases in the circumferential direction. As the height h of the chamfer 28 decreases, more of the block wall 32 is seen.

Figure 3:
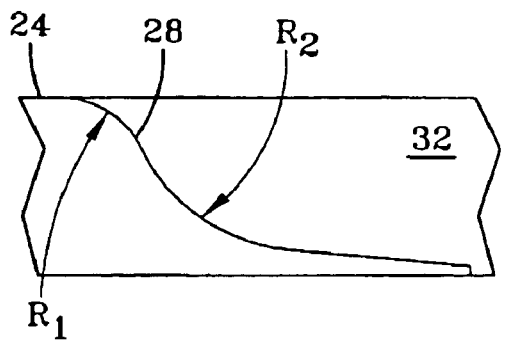

FIG. 3 illustrates a variation of the chamfer 28. The upper surface of the chamfer 28 is multi-planar. Where the chamfer 28 connects with the laterally oriented edge 24, the surface is defined by a radius of curvature R1 located inward of the upper surface of the chamfer 28. Towards the base of the chamfer 28, the top surface is defined by a radius of curvature R2 located outward of the upper surface of the chamfer 28.

Figure 4:
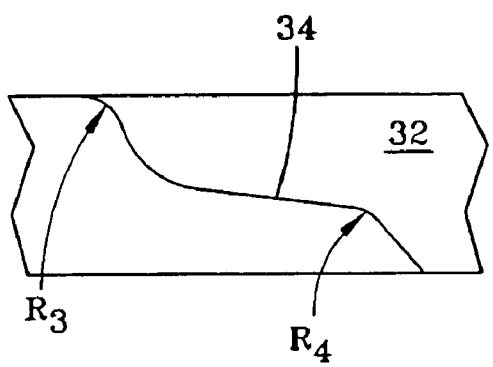

The chamfer 28 of FIG. 4 is a variation of that of FIG. 3 wherein a flat ledge 34 is employed along the mid-length of the chamfer 28. The chamfer 28 forms a tangency to a circle at several locations, as seen by R3 and R4.

Figure 5:
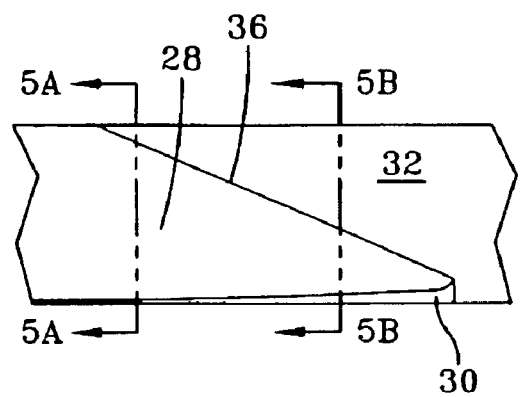
Figure 5A:
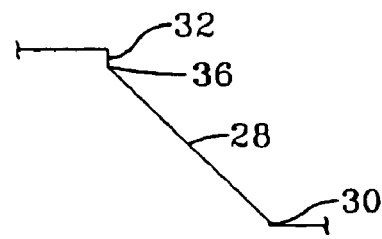
FIGS. 5a–5b are cross sectional views taken of the chamfer of FIG. 5.
Figure 5B:
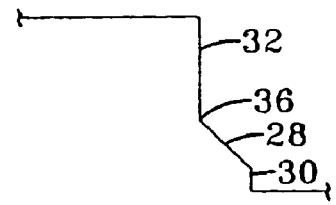

In another embodiment of the chamfer 28, FIG. 5, the top surface of the chamfer 28 has a different multi-planar configuration. At the maximum lateral width, the top surface of the chamfer 28 slopes downward toward the tread edge, see FIG. 5a. As the chamfer width decreases, the axially outer edge 30 of the chamfer 28, relative to the equatorial plane EP of the tire, gradually increases in height relative to the full tread depth. Concurrently, the axially inner edge 36 of the chamfer 28 decreases in height, see FIG. 5b. Thus, as the width of the chamfer 28 decreases, the height increases, causing the outer surface of the chamfer 28 to twist.

Figure 6:
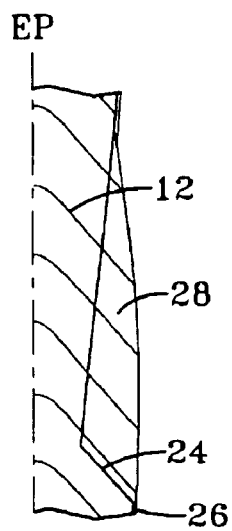
FIG. 6 is a portion of the rib and a chamfer illustrating another embodiment of the siping.

If maintaining tread flexibility as the tread is worn is desired, the sipes 12 in the center rib 10 may extend into the chamfers 28, see FIG. 6. When the tread is unworn, the sipes 12 in the chamfers 28 do not open during rotation as there is no contact with the road surface, and the chamfer 28 continues to provide support to the rib 10. After the tread begins to wear, and the uppermost surface of the chamfer 28 slowly becomes part of the ground contacting surface of the tread, the effective rib width increases, and the siping of the chamfer 28 begins to interact with the remaining tread. In effect, sipes 12 in the chamfer 28 act as increased grooving of the tread as the tread depth decreases due to wear.

The laterally oriented edge 24 of each serration 22 is inclined at an angle of equal or less than 90°, but no less than 45° relative to the equatorial plane EP. In the tread of FIG. 1, the laterally oriented edge 24 of each serration is inclined at approximately 45° relative to the equatorial plane EP. The laterally oriented edges 24 of each serration 22 on each side 18, 20 of the rib 10 are inclined as offset mirror images of the each other. The circumferentially extending edge 26 is inclined at angle of approximately 0° to 30° relative to the equatorial plane EP of the tire. When the circumferentially extending edges 26 are substantially parallel to the EP, then the circumferentially adjacent laterally oriented edges 24 are inclined in opposing directions; or else the rib 10 will "walk" across the tread. Because the chamfers 28 extend from the laterally oriented edges 24, the chamfers 28 on each side 18, 20 of the rib 10 extend in the same direction.

Adjacent to the center rib 10, in each side region B of the tread, are a plurality of steeply slanted grooves 38. The grooves 38 in each side region B of the tread are circumferentially offset from the grooves 38 in the opposing side region B. The grooves 38 initiate at the junction of the center region A and the side regions B. At the junction, the grooves 38 have a very low angle of inclination relative to the EP of the tire tread, and gradually increase in inclination. The majority of each groove 38 has an inclination angle $\alpha$ of 20° to 50° relative to the circumferential direction of the tire, as measured by the centerline of the groove 38.

As the grooves 38 traverse the side regions B of the tread, the groove width varies. Close to the central rib 10, the groove width is relatively large, though partially consumed by the chafer 28, and as it traverses the side region, the width decreases and then widens out before decreasing again at the tread edge. The region of relatively greater width in the central portion of the groove 38 is located at approximately the mid-point of the side regions B. The portion of the groove 38 with the greatest width, as measured perpendicular to the groove centerline, has a maximum width Wx of 1.5 times the width Wn of the minimum groove width of the steeply slanted grooves 38.

As the tread edge, the inclination angle of the groove 38 increases, approaching 85°. At the tread edge, the grooves have an angle of 70°–85°.

Circumferentially adjacent steeply slanted grooves 38 form circumferentially adjacent rib blocks 40. The blocks 40 initiate adjacent to the rib 10 and extend to the tread edge. At the tread edge, the block width increases. The blocks 40 extend continuously through the side regions B, however, if desired for increased water flow and traction, circumferential grooves may be provided in the side regions B to form smaller blocks.

At the axially innermost edge 42 of the blocks 40, and extending into the junction of adjacent steeply slanted grooves 38, are extending sloping chamfers 44. Each chamfer 44 has a circumferential length of $\frac{1}{60}^{th}$ to $\frac{1}{40}^{th}$ of the circumferential length of the tire. Relative to the circumferential length of the associated tread block 40, the chamfer 44 has a length of 5% to 20% of the block length, the block length being measured along parallel to the equatorial plane and exclude the chamfer length.

As the chamfer 44 extends into the junction of the grooves 38, the area of the grooves decreases with increased height of the chamfer 44. However, due to the positioning of the block chamfer 44 adjacent to the rib chamfers 38, the ability for water to flow into the grooves 38 is not compromised. As the rib chamfer 28 decreases in width and height, the block chamfer 44 increases in width and height. The placement of the circumferentially extending rib chamfers 28 in combination with the predominately circumferentially extending block chamfers 44 effectively approximate a pair of wide circumferential grooves. Thus, water flow in the tread is maintained, as is the stiffness of the central tread region.

The rib chamfer 44 can have any of the chamfer profiles as shown in FIGS. 2–5. When the chamfer of FIG. 5 is used as the rib chamfer 44, the chamfer edge that decreases in height should be the axially outer edge, relative to the EP. By placing this edge as the outer edge, water is diverted into the grooves adjacent the rib 10.

The net-to-gross ratio of the tread, and the various regions of the tread, reflects the ability of the to move water. When viewed with just two zones, as illustrated in FIG. 1, the center region has a net-to-gross ratio of 50 to 63% and each side region has a net-to-gross ratio of 55 to 70%.

To more fully appreciate the water flow capability of the tread, additional zones may be identified in each tread half. The zone F encompassing the effectively created wide circumferential grooves created by the adjacent chamfers, as measured from the axially innermost edge of the rib chamfer 28 and the axially outermost edge of the block chamfer 44 has a net-to-gross ratio of 22 to 35% when the tread is new. As the tread wears, this net-to-gross ratio increases. From the axially outermost edge of the block chamfer 44 to a location wherein the grooves 38 begin to decrease in width, the zone C, has a net-to-gross ratio of 50% to 65%. The axially outer edge of the tread, zone E, has a net-to-gross ratio of 75% to 85%, typically for the tread edges of a tire to maintain tread edge stiffness. Extending from the tread edge toward the tread center, the net-to-gross ratio decreases until it reaches a maximum at the tread center due to the rib 10.

Sipes 46 are spaced along the circumferential length of the block 40. The sipe density is the greatest toward the tread center and decreases in the direction of the tread edges. At the axially inner portion of the block 40, the sipe density has a maximum density of equal to the rib sipe density with a minimum density of 1 to 5 sipes per inch (0.393–1.97 sipes/cm). At the axially outer portion of the block 40, the sipe density is in the range of 0.5 to 3 sipes per inch (0.2 to 1.18 sipes/cm). The variation in the block sipe density cooperates with the high density siping in the tread rib 10 to gradually vary the tread stiffness. Additionally, as noted previously, the heavier siping in the center of the tread improves the snow driving performance of the tire by increasing the number of tread edges in the center of the tire while providing for a stiff tread at the outer tread zones.

At the axially outermost 25% of the each side region B, the sipes 46 extend into the tread shoulders. To assist in water drainage and flexibility at the tread edge, the sipes 46 may have increased width, as illustrated at FIG. 1. Each sipe 46 in the shoulder has a wide width portion 48 and a narrow width portion 50. In each block, the sipes 46 are arranged so that the wide width portions 48 and the narrow width portions 50 are circumferentially alternating.

For the directional tread illustrated in FIG. 1, the steeply slanted grooves 38 in each side region B are mirror images, though laterally offset, of the steeply slanted grooves 38 in the opposing side region B. Also, due to the directional nature of the tread, all of the rib chamfers 28 are pointed in one direction and all the block chamfers 44 are pointed in the opposing direction.

FIG. 7 illustrates the previously described tire tread as a non-directional tire tread. The steeply slanted grooves 38 in each side region B are laterally offset mirror inverse images of the grooves 38 in the opposing side region B. The laterally oriented edges 24 of at the center one rib 10 are inclined in the same direction. To maintain the serrated configuration, the circumferentially extending edges 26 are inclined in the same direction, parallel to each other. The rib chamfers 28 on opposing sides of the rib 10 point in opposing directions, while the block chamfers 44 in each side region B point in the opposite direction from the block chamfers 44 in the opposing side region B.

The sipes in the rib 10 of the non-direction tread are formed of three portions, wherein the first 52a and third 52b portions of the sipe 52 are inclined at substantially equal inclination angles. The block sipes 54 in the side regions B are inclined at angles substantially equal, but no more than 10° greater, than the rib sipe portion located adjacent to the relative side region. In the instant tread, the overall sipe pattern for the entire tread is inclined at an angle opposite that of the steeply slanted grooves 38.

Other features of the non-direction tread may be identical to that of the directional tread, with permissible variations in accordance with those already discussed.

What is claimed is:

1. A pneumatic tire comprising a tread and shoulders adjacent the tread, the tread comprising a central region and a pair of opposing side regions, the tread further comprising a circumferentially extending rib in the central region, and a plurality of steeply slanted grooves inclined at an angle relative to the circumferential direction of the tire in each side region, the tread having a tread surface at the outermost surface of the tread and a tread depth defined at the base of the grooves, wherein the steeply slanted grooves in each side region initiate at the junction of the central region and the side regions and terminate in the shoulders, the adjacent steeply slanted grooves meeting to form circumferentially adjacent tread blocks, the blocks extending from the central region to the shoulders, and a chamfer located at the axially innermost point of the blocks, the chamfers extending into the junction of the steeply slanted grooves, wherein the lateral edges of the rib have a plurality of laterally oriented edges and circumferentially extending edges extending substantially straight between the laterally oriented edges at the tread surface when the tread is un-worn, the laterally oriented edges on each side of the rib being circumferentially offset from the laterally oriented edges on the opposing side of the rib, and extending from each laterally oriented edge toward the circuniferentially adjacent laterally oriented edge is a chamfer, the chamfer circumferentially extending along the lateral edge of the rib, the rib having an almost straight configuration at the tread depth and wherein the block chamfer in each side region and the rib chamfer located on the adjacent lateral edge of the rib are axially adjacent.

2. The tire of claim 1 wherein the tread blocks extend continuously from the central region to the shoulders.

3. The tire of claim 1 wherein the plurality of circumferentially extended edges connect with the plurality of laterally oriented edges, and wherein each rib chamfer extending from a laterally oriented edge decreases in width from the laterally oriented edge to the circumferentially adjacent laterally oriented edge.

4. The tire of claim 1 wherein the radial height of the rib chamfer decreases from the laterally oriented edge to the circumferentially adjacent laterally oriented edge.

5. The tire of claim 1 wherein the axially outermost edge of the rib chamfer, relative to the central region of the tire, gradually increases in height from the laterally oriented edge to the adjacent laterally oriented edge, while the axially innermost edge of the rib chamfer gradually decreases in height.

6. The tire of claim 1 wherein the steeply slanted grooves have a non-constant width as the grooves extend from the central region to the shoulders, the grooves having a maximum width in the central 15% of each side region of the tread.

7. The tire of claim 6 wherein the grooves have a maximum width of at least 1.5 times the minimum groove width of the steeply slanted grooves.

8. The tire of claim 1 wherein the tread rib has a plurality of sipes, the sipes have a density of 2 to 8 sipes per inch (0.78–3.15 per cm).

9. The tire of claim 8 wherein the sipes extend laterally into the rib chamfers.

10. The tire of claim 1 wherein the net-to-gross ratio of the tire decreases from the tread edge toward the tread center, with a maximum net-to-gross ratio at the equatorial plane of the tire.

11. The tire of claim 1 wherein the net-to-gross ratio on each side of the rib,
measured from the axially innermost edge of the rib chamfer to the axially outermost edge of the block chamfer, is in the range of 22 to 35%.

12. The tire of claim 1 wherein as the rib chamfer decreases in width and height along one direction of the tire, the adjacent block chamfer increases in width and height along the same direction of the tire.

13. The tire of claim 1 wherein the chamfers on opposing sides of the rib are circumferentially overlapping.

14. The tire of claim 1 wherein the axially outer edge of each rib chamfer, relative to the centerline of the rib, is convexly curved.

15. A pneumatic tire comprising a tread and shoulders adjacent the tread, the tread comprising a central region and a pair of opposing side regions, the tread further comprising a circumferentially extending rib in the central region, and a plurality of steeply slanted grooves inclined at an angle relative to the circumferential direction of the tire in each side region, the tread having a tread surface at the outermost surface of the tread and a tread depth defined at the base of the grooves, wherein the steeply slanted grooves in each side region initiate at the junction of the central region and the side regions and terminate in the shoulders, the adjacent steeply slanted grooves meeting to form circumferentially adjacent tread blocks, the blocks extending from the central region to the shoulders, and a chamfer located at the axially innermost point of the blocks, the chamfers extending into the junction of the steeply slanted grooves, and wherein the lateral edges of the rib have a plurality of laterally oriented edges at the tread surface when the tread is un-worn, the laterally oriented edges on each side of the rib being circumferentially offset from the laterally oriented edges on the opposing side of the rib, and extending from each laterally oriented edge toward the circumferentially adjacent laterally oriented edge is a chamfer, the chamfer circumferentially extending along the lateral edge of the rib and the axially outer edge of each chamfer, relative to the centerline of the rib, being convexly curved, the rib having an almost straight configuration at the tread depth.

16. A pneumatic tire comprising a tread and shoulders adjacent the tread, the tread comprising a central region and a pair of opposing side regions, the tread further comprising a circumferentially extending rib in the central region, and a plurality of steeply slanted grooves inclined at an angle relative to the circumferential direction of the tire in each side region, the tread having a tread surface at the outermost surface of the tread and a tread depth defined at the base of the grooves, wherein the steeply slanted grooves in each side region initiate at the junction of the central region and the side regions and terminate in the shoulders, the adjacent steeply slanted grooves meeting to form circumferentially adjacent tread blocks, the blocks extending from the central region to the shoulders, and a chamfer located at the axially innermost point of the blocks, the chamfers extending into the junction of the steeply slanted grooves, wherein the lateral edges of the rib have a plurality of laterally oriented edges and circumferentially extending edges extending substantially straight between the laterally oriented edges at the tread surface when the tread is un-worn, and extending from each laterally oriented edge toward the circumferentially adjacent laterally oriented edge is a chamfer, the chamfer circumferentially extending along the lateral edge of the rib, the rib having an almost straight configuration at the tread depth and wherein the block chamfer in each side region and the rib chamfer located on the adjacent lateral edge of the rib are axially adjacent.

* * * * *